(12) United States Patent
Adams et al.

(10) Patent No.: US 11,651,335 B2
(45) Date of Patent: May 16, 2023

(54) METHODS AND DEVICES FOR CONTROLLING A MINING POOL FOR MULTIPLE BLOCKCHAIN NETWORKS

(71) Applicant: nChain Licensing AG, Zug (CH)

(72) Inventors: Angus Adams, London (GB); Steven Patrick Coughlan, London (GB)

(73) Assignee: nChain Licensing AG, Zug (CH)

( * ) Notice: Subject to any disclaimer, the term of this patent is extended or adjusted under 35 U.S.C. 154(b) by 449 days.

(21) Appl. No.: 16/805,614

(22) Filed: Feb. 28, 2020

(65) Prior Publication Data

US 2021/0272075 A1 Sep. 2, 2021

(51) Int. Cl.
| | |
|---|---|
| *H04L 9/00* | (2022.01) |
| *G06Q 20/06* | (2012.01) |
| *H04L 9/06* | (2006.01) |
| *G06N 5/046* | (2023.01) |
| *H04L 41/50* | (2022.01) |
| *H04L 67/288* | (2022.01) |
| *H04L 67/10* | (2022.01) |

(52) U.S. Cl.
CPC ........... *G06Q 20/065* (2013.01); *G06N 5/046* (2013.01); *H04L 9/0618* (2013.01); *H04L 9/0643* (2013.01); *H04L 41/5096* (2013.01); *H04L 67/10* (2013.01); *H04L 67/288* (2013.01); *G06Q 2220/00* (2013.01); *H04L 9/50* (2022.05); *H04L 2209/56* (2013.01)

(58) Field of Classification Search
CPC ... H04L 41/5096; H04L 67/10; H04L 67/288; H04L 2209/56; H04L 9/0618; H04L 9/50; G06Q 20/065; G06N 5/046
See application file for complete search history.

(56) References Cited

FOREIGN PATENT DOCUMENTS

| | | | | |
|---|---|---|---|---|
| CA | 3074205 A1 | 8/2021 | | |
| EP | 3825942 A1 * | 5/2021 | ............. | G06F 21/10 |
| JP | 6897973 B2 * | 7/2021 | ......... | G06F 16/2455 |

OTHER PUBLICATIONS

Antonopoulos, "Mastering Bitcoin—Unlocking Digital Cryptocurrencies," O'Reilly Media, Inc., Dec. 20, 2014, 282 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.

* cited by examiner

*Primary Examiner* — Cheikh T Ndiaye
(74) *Attorney, Agent, or Firm* — Davis Wright Tremaine LLP

(57) ABSTRACT

Methods and systems to control mining pools configured to mine more than one blockchain network. A pool controller may automatically select a candidate block generated for one of the blockchain networks for mining by the mining units. The selection may be based on determining an expectation value associated with each current candidate block generated for the respective blockchain networks and which of them is the highest. The expectation value may be based, at least in part, on a current coinbase value and a current difficulty setting for that blockchain network. The pool control may perform the selection with the generation of each new candidate block for any of the blockchain networks.

20 Claims, 5 Drawing Sheets

METHODS AND DEVICES FOR CONTROLLING A MINING POOL FOR MULTIPLE BLOCKCHAIN NETWORKS

CROSS-REFERENCE TO RELATED APPLICATIONS

This application incorporates by reference for all purposes the full disclosure of co-pending Canadian Patent Application No. CA 3074205, filed Feb. 28, 2020, entitled "METHODS AND DEVICES FOR CONTROLLING A MINING POOL FOR MULTIPLE BLOCKCHAIN NETWORKS," the content of which is incorporated by reference herein in its entirety.

TECHNICAL FIELD

The present disclosure relates to blockchain networks and, in particular, to controlling a mining pool.

BACKGROUND

Mining nodes (or "miners") are key elements of a blockchain network. In "proof-of-work" blockchain networks, the mining nodes compete to complete a proof-of-work in order to "win" the race to mine a block and thereby collect the transaction fees and any newly-minted tokens reflected in a coinbase transaction within the new block. In this manner, the miners secure the network, ensuring that transactions are valid and that all participating nodes conform to the prevailing blockchain protocol. Nodes validate the transactions and blocks containing the transactions against prescribed criteria for validity before propagating the transactions and blocks throughout the blockchain network.

As the network scales and proof-of-work searches become more computationally difficult, the mining function demands significant computing power (sometimes termed "hashpower"). As a result, mining pools have developed. Mining pools typically involve a large number of mining units that are specifically configured to carry out the computational work of searching for a proof-of-work. The activity of the mining units may be coordinated by a pool coordinator, which is a computing device configured to assemble a candidate block and to provide that candidate block to the mining units for them to work upon.

There are a number of different blockchain networks, each having its own blockchain protocol that governs its operation. Some of these separate blockchain networks are a result of a previous hard fork that resulted in two separate blockchain networks, each with a different blockchain protocol. Other separate blockchain networks are completely different from the outset. Miners are in the position of deciding which blockchain network to devote their computing resources to since the potential revenue available from mining varies from network to network and may change over time.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLES

Figure 1:
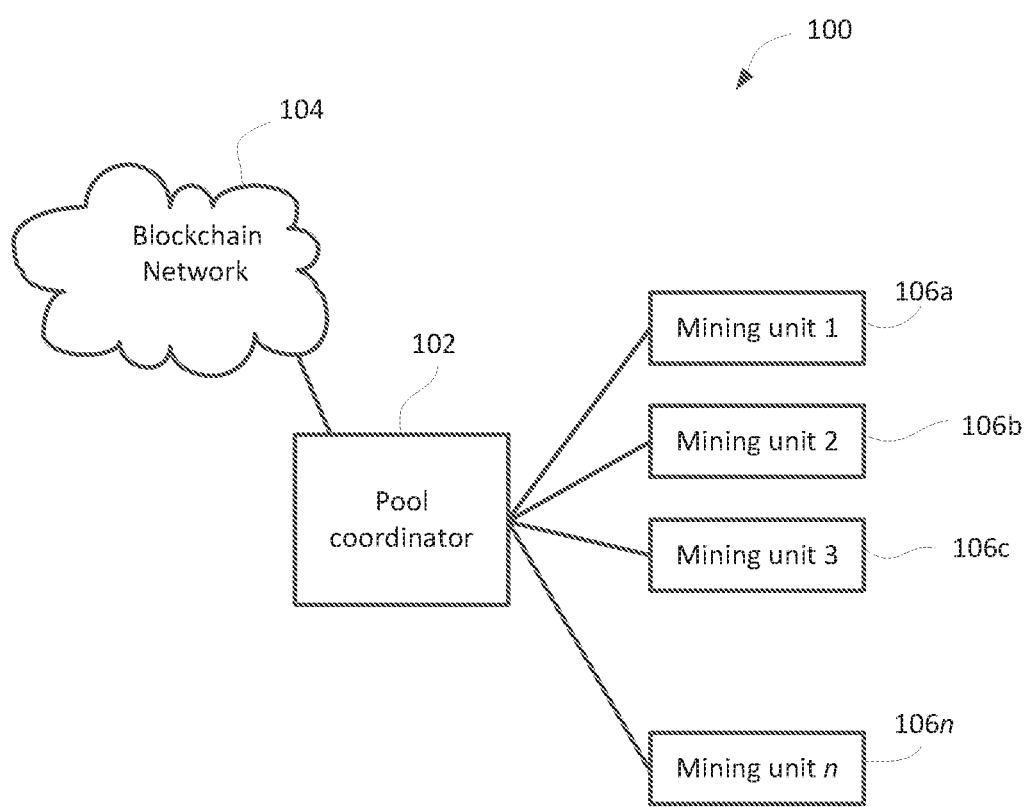
FIG. 1 shows an example mining pool for a blockchain network.

In one aspect, there may be provided a computer-implemented method of controlling a mining pool, the mining pool containing a plurality of mining units and a pool controller, the mining units being configured to mine in accordance with a plurality of blockchain protocols. The method may include, for each of a plurality of blockchain networks, generating a respective candidate block containing a plurality of transactions from that blockchain network and having a candidate block header that includes a coinbase value and a difficulty setting for that blockchain network; for each of the candidate blocks, determining an expectation value based on the difficulty setting and the coinbase value for that candidate block; based on a comparison of the expectation values, selecting the candidate block associated with the highest of the expectation values; and providing the candidate block header for the selected candidate block to the mining units for mining.

In some implementations, determining the expectation value may include determining a probability of finding a next block based on the difficulty setting, and multiplying the probability by the coinbase value to determine the expectation value. In some cases, the difficulty setting may include a target value in an nBits field in the candidate block header, and determining the probability is based on the target value divided by a total hash space value.

In some implementations, the method further includes outputting an identifier of the blockchain network associated with the highest of the expectation values. Outputting may include publishing to a log in some examples. In some cases, outputting may include transmitting to the mining units. In those cases, providing may include providing each of the candidate block headers to the mining units, and wherein the mining units are configured to select the selected candidate block for mining based on the identifier transmitted.

In some implementations, selecting the candidate block includes converting the expectation values to a common unit for the comparison. Converting may include requesting and receiving conversion factors from an external database for converting the expectation values to the common unit. The common unit may be a unit associated with one of the blockchain networks.

In a further aspect, the present application describes a system to control a mining pool, the mining pool containing a plurality of mining units and a pool controller, the mining units being configured to mine in accordance with a plurality of blockchain protocols. The system may include one or more processors; memory; and computer-executable instructions stored in the memory that. When executed by the one or more processors, the instruction may cause the processors to, for each of a plurality of blockchain networks, generate a respective candidate block containing a plurality of transactions from that blockchain network and having a candidate block header that includes a coinbase value and a difficulty setting for that blockchain network; for each of the candidate blocks, determine an expectation value based on the difficulty setting and the coinbase value for that candidate block; based on a comparison of the expectation values, select the candidate block associated with the highest of the expectation values; and provide the candidate block header for the selected candidate block to the mining units for mining.

In another aspect, there may be provided a computing device implementing a node in a blockchain network. The computing device may include memory, one or more processors, and computer-executable instructions that, when executed, cause the processors to carry out one or more of the methods described herein.

In yet another aspect, there may be provided a computer-readable medium storing processor-executable instructions for operating a node in a network, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message," deterministically produce a unique fixed-length alphanumeric string. The result of a hash function may be called a hash value, fingerprint, hash result, or equivalent. Example hash functions include, but are not limited to, SHA-2, SHA-3, and BLAKE2.

In this document, the term 'blockchain' is understood to include all forms of electronic, computer-based, distributed ledgers. These include consensus-based blockchain and transaction-chain technologies, permissioned and un-permissioned ledgers, shared ledgers and variations thereof. While example blockchain protocols may be discussed below for illustrative purposes, the present application is not limited to use with any particular blockchain or blockchain protocol, and alternative blockchain implementations and protocols fall within the scope of the present application.

A blockchain is a peer-to-peer, electronic ledger which is implemented using a computer-based decentralised, distributed system. The blockchain is made up of blocks which in turn are made up of transactions. Each transaction is a data structure that encodes, among other possible information, the transfer of control of a digital resource in the blockchain system and includes at least one input and at least one output. Transactions may contain small programs known as scripts embedded into their inputs and outputs, which specify how and under what conditions the outputs of the transactions can be accessed. On some platforms, these scripts are written using a stack-based scripting language. Access to the digital resource and the ability to further distribute some or all of the digital resource is governed by the unlocking conditions on the output. An example condition typically includes a digital signature using a private key corresponding to a public key used to lock the output, although many other conditions may be imposed.

Each block header contains a summary of the block's contents, such as in the form of a Merkle root, and each block header contains a hash of the previous block header so that blocks become chained together to create a permanent, unalterable record of all transactions which have been written to the blockchain since its inception.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners," collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In some examples, a POW involves hashing a block header containing a nonce until the result of the hashing is below a target value or number that is set by a difficulty parameter. The nonce is repeatedly incremented and the hashing repeated until the result is below the target value or until the miner receives notice that another miner has succeeded. Variations in mining process will be familiar to those ordinarily skilled in the art.

As noted above, mining nodes are key to securing the blockchain network. Mining nodes are compensated for their work when they win the race to find a valid new block. The compensation comes through transaction fees from individual transactions and from a "coinbase" transaction that is included in the new block. A coinbase transaction has no inputs (or, more properly, an empty or null input field) and it outputs a prescribed quantity of tokens (e.g. coins) to the miner, effectively creating new tokens. A coinbase transaction may also be referred to as a "generation transaction," and those terms may be used interchangeably herein. The coinbase or generation transaction has certain characteristics that distinguish it from regular transactions. For example, each valid block contains only one generation transaction. Each generation transaction takes no input (or the input field, if any, does not affect the transaction) and generates an output of tokens of a quantity set by the then-prevailing block reward due to a successful miner according to the governing blockchain protocol. The generation transaction is a "proof-of-work transaction," as it can only be created by a mining node that successfully mines a block, i.e. completes a proof of work.

In at least one example blockchain, the hashing of the block header to find a POW is a double-hash, which may be expressed herein using the notation $H^2(\bullet)$ In some such examples, the hash function used is SHA-256. Other blockchain networks may use other hashes.

Reference is now made to FIG. 1, which diagrammatically illustrates an example of a mining pool 100 for a blockchain network. The mining pool 100 includes a pool coordinator 102 coupled to a blockchain network 104. The pool coordinator 102 includes a computing device, with at least a processor and memory, configured to connect to and communicate with nodes on the blockchain network 104. The pool coordinator 102 may maintain a mempool of unconfirmed transactions in some implementations. In some implementations, the pool coordinator 102 may have access to a mempool of unconfirmed transactions maintained by another node in the blockchain network 104.

The mining pool 100 includes a plurality of mining units 106 (shown individually as 106a, 106b, 106c, . . . , 106n). The mining units 106 are communicably connected to the pool coordinator 102 through one or more networks, which may include wired or wireless networks, private or public networks, and/or the blockchain network 104. The mining units 106 are configured to carry out proof-of-work (POW) calculations in search of a POW for a candidate block header. The calculations include repeatedly hashing the block header, determining whether the hash result falls below the target value set by the difficulty setting, and, if not, changing a nonce and/or timestamp and/or the coinbase transaction, and repeating. The mining units 106 may include a central processing unit (CPU), a graphics processing unit (GPU), or an application-specific integrated circuit (ASIC) designed to carry out the POW calculations at high speed.

If a solution to the POW is found by one of the mining units 106, it may immediately propagate the solution on the blockchain network 104 in some cases. In some cases, it may notify the pool coordinator 102 regarding the solution and the pool coordinator 102 may propagate the solution on the blockchain network 104. If a solution is found by one of the mining nodes 106 and the resulting block is propagated quickly enough on the blockchain network 104, the pool coordinator 102 and/or mining unit 106 receive the reward resulting from successful mining of a block. The reward includes any tokens or coins minted in a coinbase transaction in the block and any fees from transactions included in the block. In some implementations, the pool coordinator 102 receives the block reward and distributes portions of the block reward to individual mining entities on the basis of their relative contributions of hashpower to the mining pool 100, i.e. the computational power represented by the individual mining units 106 contributed by each mining entity that is a member of the pool.

The pool coordinator 102 may be configured to do the work of assembling candidate blocks, including validating unconfirmed transactions that are received over the blockchain network 104, determining which transactions to include in a candidate block, and building the candidate block header. The building of the candidate block header may include determining the Merkle tree root based on the contents of the block, i.e. the included transactions. The building of the candidate block header may also include specifying the difficulty setting, i.e. the hashing target value. In the Bitcoin SV™ blockchain, this value may be specified in the nBits field. The building of the candidate block header may further include determining the block reward, i.e. the total of the coinbase reward and transaction fees. In some cases, this value may be included in a block header. In some cases it may not be included. In some cases, this value is specified in a coinbaseValue field.

In some implementations, the candidate block header may be referred to as a candidate block header template, a block template, or a candidate block template. All these terms are treated as synonymous for the purposes of this description and refer to the incomplete block header, indicating that individual mining units 106 will insert at least a nonce value and timestamp before hashing the header.

Figure 2:
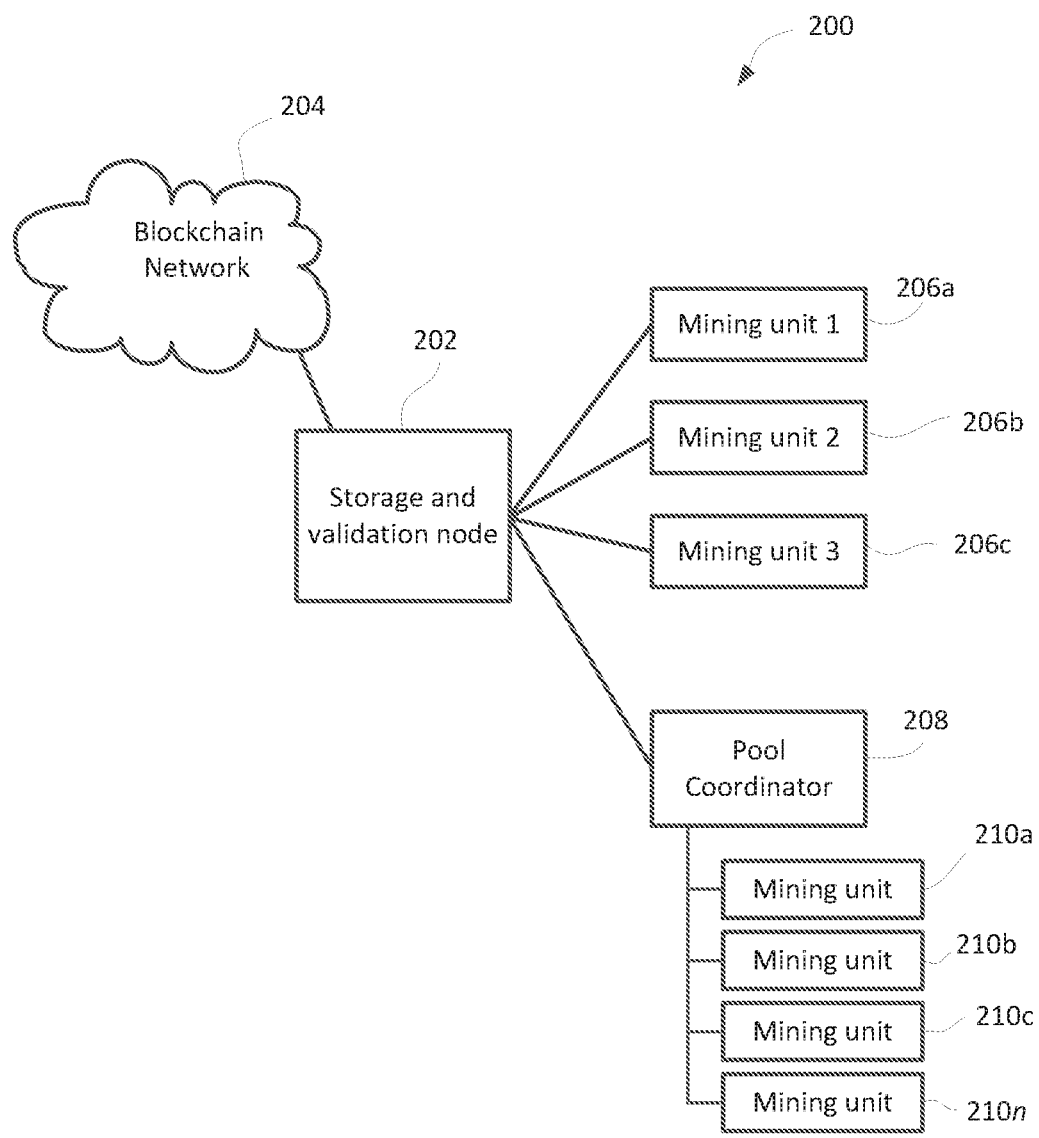
FIG. 2 shows an alternative architecture for an example mining pool for a blockchain network.

FIG. 2 diagrammatically illustrates an alternative system architecture for an example mining pool 200. In this example, mining pool 200 may include a plurality of mining nodes, including mining units 206 (shown individually as 206a, 206b, 206c). The mining nodes may include other mining pools, or sub-pools, such as the mining pool formed by a pool coordinator 208 and its associated mining nodes 210 (shown individually as 210a, 210b, 210c, 210n). The role of the pool coordinator in the mining pool 200 may be carried out by a storage and validation node 202 configured to validate transactions and/or manage mempool storage for mining nodes. The storage and validation node 202 is part of a blockchain network 204 and it creates a candidate block template that it transmits to subscribing mining nodes.

In some example mining pools, mining units may be configured to perform proof-of-work operations in accordance with more than one blockchain protocol. That is, they may be capable of mining blocks on two or more types of blockchain networks. Accordingly, the pool coordinator or the individual mining units need to determine which blockchain network on which to mine blocks. In existing systems, an administrator selects a blockchain network and instructs the mining pool to attempt to mine blocks on that selected network. This selection can sometime be impacted by political or social considerations.

In many mining pools, the pool coordinator generates and sends a new candidate block template to the mining units on a regular basis, e.g. every 1 minute, 30 seconds, 20 seconds etc. to add additional transactions to the candidate block. Each new candidate block has a different block reward as the transaction fees may change depending on the transactions included in the candidate block. Moreover, on a much slower timeline the coinbase reward may change as the governing blockchain protocol automatically adjusts the availability of newly-minted tokens permitted.

In addition, the difficulty setting changes from time-to-time. As an example, with the Bitcoin™ Core (BTC) protocol, the difficulty setting changes every 2016 blocks, which equates to approximately every two weeks. In the Bitcoin Cash™ (BCH) and Bitcoin SV™ (BSV) protocols, the difficulty setting may potentially change with every block to maintain an average new block discovery time of 10 minutes.

The constant change in block rewards and difficulty setting means that at any point the decision to mine on a particular blockchain network may result in wasted hashpower resources that could be better allocated in mining on a different blockchain network. Accordingly, in accordance with one aspect of the present application, systems and methods are described for controlling a mining pool to automatically select a blockchain network for mining operations on-the-fly.

In some example implementations, the pool coordinator is configured to select a blockchain network for mining operations each time it generates and/or sends a candidate block template to the mining nodes. That is, rather than selecting a network and then generating a corresponding candidate block template for that network, the pool coordinator may generate candidate blocks for a plurality of blockchain networks and, with each new candidate block generated, compare the expected return from mining that candidate block against the expected return of mining the candidate blocks associated with each of the other blockchain networks to identify and select the candidate block with the highest associated expected return. The pool coordinator may then provide that candidate block to the mining units with instructions to mine in accordance with the associated blockchain protocol. In some cases, the pool coordinator may provide the mining units with all the candidate blocks. The mining units may then determine which blocks to mine and may make their selection, at least in part, based on the blockchain network selected by the pool coordinator. The pool coordinator's selection may be output to the mining units by way of a transmitted identifier or publication to a log or other location the mining units may access.

Figure 3:
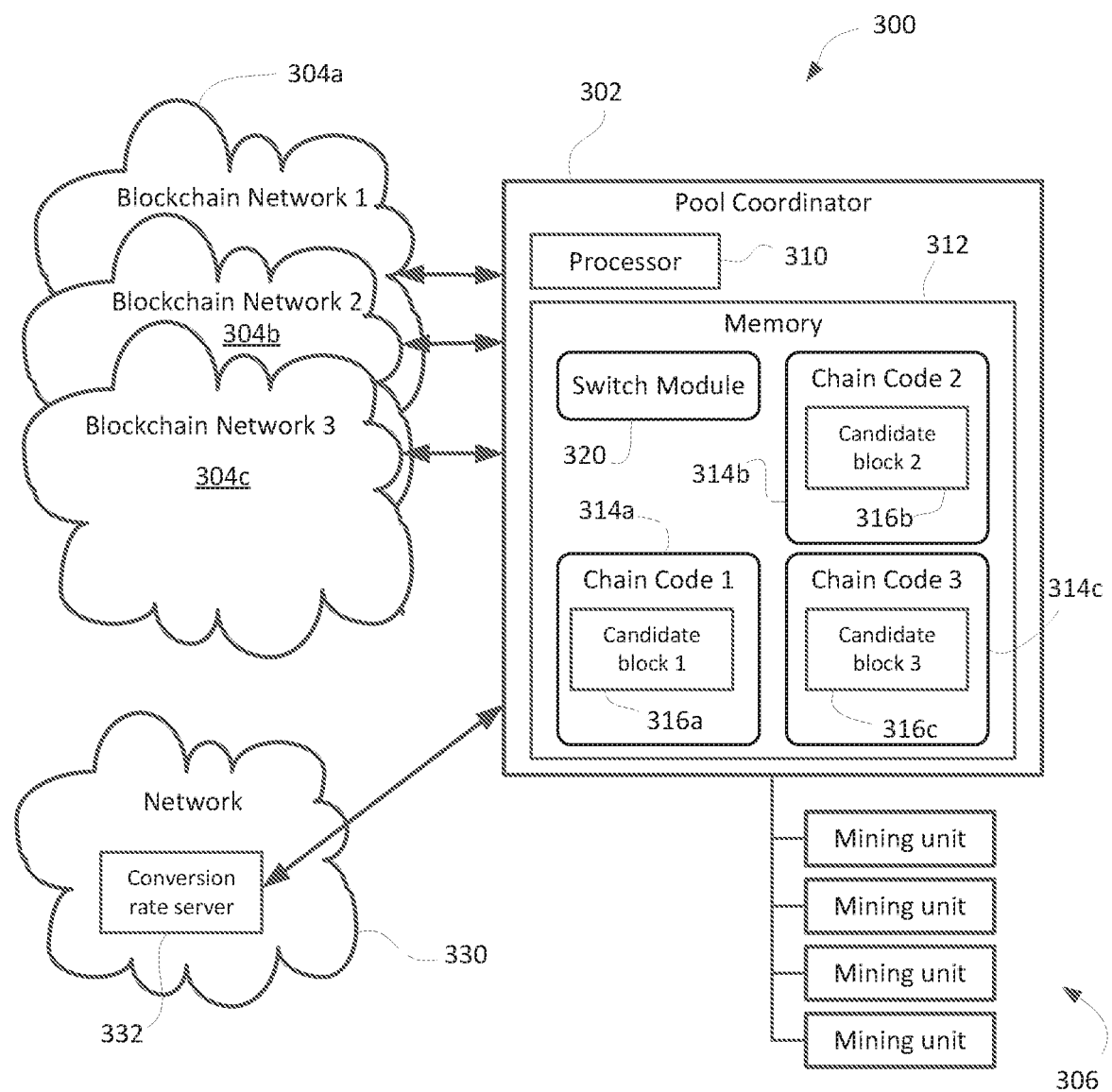
FIG. 3 shows an example system for controlling a mining pool.

Reference is now made to FIG. 3 which shows one example system 300 for controlling a mining pool. The system 300 includes a pool coordinator 302 with communication connections to a plurality of blockchain networks 304 (shown individually as 304a, 304b, 304c). The pool coordinator 302 generates and provides candidate block headers to a plurality of mining units 306. The pool coordinator 302 is a network-connected computing device that includes, at least, a processor 310 and a memory 312.

The memory 312 may store computer-readable software instructions that, when executed by the processor 310, cause the pool coordinator 302 to carry out one or more of the operations described herein. The memory 312 may include more than one memory and type of memory, including volatile and non-volatile memory storage devices. In some cases, the memory 312 stores computer-executable code and blockchain-related data. The memory 312 may include a database or other memory structure for storing blockchain data, which may include a mempool of unconfirmed transactions for one or more of the blockchain networks 304. In some cases, the memory 312 may store a full copy of the blockchain for one or more of the blockchain networks 304.

The computer-executable code stored in memory 312 may include blockchain code 314 (shown individually as 314a, 314b, 314c) that includes instructions that, when executed, cause the pool coordinator 302 to carry out the operations for validating transactions and blocks in accordance with a respective blockchain protocol for one of the blockchain networks 304. The operations may include operations for building a candidate block template for one of the blockchain networks 304. In this example, blockchain code 314a builds a first candidate block 316a containing unconfirmed transactions from blockchain network 304a in accordance with its governing blockchain protocol. Blockchain code 314b builds a second candidate block 316b containing unconfirmed transactions from blockchain network 304b in accordance with its governing blockchain protocol. Blockchain code 314c builds a third candidate block 316c containing unconfirmed transactions from blockchain network 304c in accordance with its governing blockchain protocol. The blockchain codes 314a, 314b, 314c may run independently in the pool coordinator 302 generating candidate block templates for their respective blockchains in accordance with their respective governing blockchain protocols at whatever times are suitable or applicable to that protocol.

The pool coordinator 302 may, in some examples, send candidate block headers to the mining units 306, e.g. candidate block header templates into which the mining units insert at least a nonce and timestamp. The pool coordinator 302 may, in some embodiments, select which blockchain the pool should mine and send only candidate block headers from the chain code 314 associated with that blockchain. The selection may be made with each new candidate block header generated in some cases.

The pool coordinator 302 may include a switch module 320. The switch module 320 may include processor-executable instructions that, when executed by the processor 310, cause the processor 310 to carry out the operations described below to select a blockchain network on which to have the pool mine. The switch module 320 may be a stand-alone software module or may be incorporated into other software.

The switch module 320 determines an expectation value for each of the candidate blocks and compares them to identify the candidate block, and associated blockchain, that has the highest expectation value. The switch module 320 outputs an identifier of the selected candidate block and/or blockchain corresponding to the highest expectation value. In some implementations, the mining units 306 may passively accept whichever candidate block is sent to them without necessarily knowing to which blockchain they relate. In such a case, the pool coordinator 302 select and transmits the candidate block based on the identifier generated by the switch module 320. In some cases, the switch module 320 may publish or log the generated identifier that specifies the selected blockchain, and the pool coordinator 302 may check the most-recently published or logged identifier whenever the pool coordinator 302 needs to send a candidate block to the mining units 306 to determine which candidate block to send.

In some implementations, the switch module 320 publishes the expectation values and mining units 306 may determine whether to switch to mining a different blockchain based on the published values. In some cases, the switch module 320 tracks a current blockchain selection and only initiates a switch to a different blockchain if the expectation value of the different blockchain exceeds the expectation value of the current blockchain selection by more than a threshold amount to prevent rapid changes in blockchain selection.

The switch module 320 determines the expectation value for a candidate block based on the difficultly setting for that candidate block and the coinbase value. As will be described further below, the switch module 320 may further convert the expectation value from a native unit for the specific blockchain to a common unit in order to facilitate comparison of expectation values across blockchains.

The difficulty setting is a value reflecting the computational difficulty of solving the proof-of-work problem. The difficultly setting may be specified in the candidate block header. In some examples, the difficulty setting is reflected in a target value specified in the candidate block header, e.g. within the nBits field. The probability of finding the POW solution, i.e. the probability of a hash being below the target value, is based on a ratio of the target value to the total hash space value. The total hash space value indicates the total range of possible hash results. For example, the total hash space value for a SHA256 hash is $2^{256}-1$. A proper calculation of the probability of the likelihood of solving the POW solution multiplies the ratio by the hashpower of the mining pool, but because the expectation values are being compared relative to each other the hashpower of the mining pool is arbitrary in determining the relative ranking of expectation values. In some implementations, an arbitrary hashpower value may be used to scale the results to a convenient numberspace, a unity hashpower may be used, or no hashpower multiplication may be used.

The coinbase value is a value reflecting the block reward, which may include newly-minted tokens or coins in a coinbase transaction in the candidate block and the cumulative transaction fees from the transactions included in the candidate block. It will be understood that transaction fees are typically a small number of tokens or coins allocated to a successful miner for including the transaction in a mined block. The fees are specified in the transaction itself. This coinbase value may be reflected in a coinbaseValue field in the candidate block header in some implementations.

The expectation value may be determined as the product of the probability associated with the difficulty setting and the coinbase value. In other words, the expectation value may be determined as the product of the target value, the coinbase value, and divided by the total hash space value. The expectation value may further be multiplied by a conversion factor to put it into a common unit for comparison to other expectation values. The expectation value may further involve multiplication by a hashpower value in some implementations.

Each time a new candidate block 316 is created for any of the blockchain networks 304 by the respective blockchain code 314, the switch module 320 may determine the expectation value for that candidate block 316 and may compare the determined expectation value to the expectation values previously calculated for the current candidate blocks 316 for the other blockchain networks 304 to identify which has the highest expectation value. If the new candidate block 316 has a higher expectation value than the current candidate blocks 316, then the switch module 320 may output a switch signal, identifier, or other command or instruction signaling that the mining units 306 are to switch to mining the new candidate block. In some cases, the output may be a command or instruction to the pool coordinator 302 to send the new candidate block 316 to the mining units 306 in place of the current selected candidate block being mined. In some cases, the blockchain code 314 may automatically push each new candidate block 316 to the mining units 306, in which case the output from the switch module 320 may be a signal or command to the mining units 306 to mine the new candidate block. In some cases, the switch module 320 may be more passive and may regularly log the selected blockchain identifier and the pool coordinator 302 may consult the log to determine the most-recently identified blockchain whenever the pool coordinator 302 needs to send a new candidate block to the mining units 306. It then selects and sends the candidate block based on the logged identifier from the switch module 320.

In an alternative implementation, the switch module 320 may output an identifier of the selected candidate block, an identifier of the associated blockchain, the expectation value, or the list of expectation values, and the individual mining units 306 may determine from that information whether to switch to mining the new candidate block. The information may transmitted directly to the mining units 306 or may be published to a log or other location to which the mining units 306 have access.

The switch module 320 may initially determine each expectation value in a unit native to the respective blockchain network. That is, each coinbase value reflects the token or unit associated with its associated blockchain network, meaning the resulting expectation value is reflective of that token. In order to compare expectation values, they need to be converted by the switch module 320 to a common unit. Accordingly each expectation value may be multiplied by a respective conversion factor, where the conversion factor is a ratio of the common unit to the respective blockchain unit. As an example, the blockchain unit may be BSV or BTC or some other token or coin and the common unit may be USD, for instance. Accordingly, the conversion factors may be BSV:USD or BTC:USD, for example. In some cases, the common unit is one of the blockchain units. For example, all expectation values may be converted to BTC or some other coin or token used by one of the blockchain networks. This means that for the expectation value associated with that network its conversion factor is 1:1.

The switch module 320 may obtain conversion factors on a real-time basis from an external source. For example, a conversion rate server 332 may make live conversion rate data available over a network 330, like the Internet. The conversion rate server 332 may be a website or other accessible online resource for conversion rate data. In some cases, the conversion rate server 332 may provide an API or other interface code to enable the switch module 320 to easily request and receive live conversion rate data.

Figure 4:
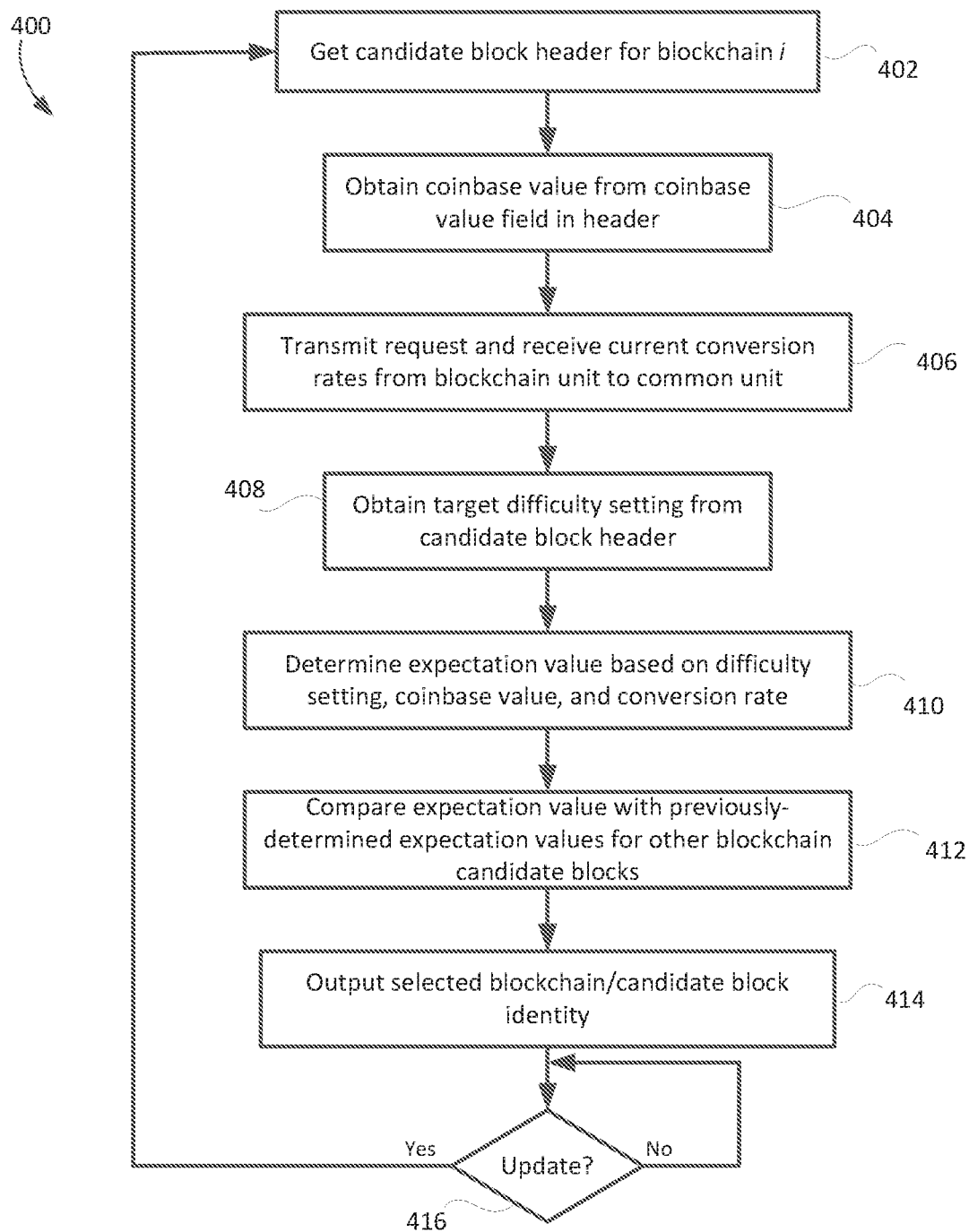
FIG. 4 shows, in flowchart form, one example method for controlling a mining pool.

Reference is now made to FIG. 4, which shows, in flowchart form, one example method 400 for controlling a mining pool. The method 400 may be implemented by a pool coordinator in some embodiments. Operations of the method 400 may be carried out by a processor of a computing device under control of a software application or module containing processor-executable instructions. The computing device may be connected to a plurality of blockchain networks and may include processor-executable computer code that causes one or more processors to generate candidate blocks having candidate block headers for the plurality of blockchain networks.

In operation 402, a candidate block header for an ith blockchain is generated. The candidate block header may be an incomplete block header lacking a nonce and timestamp in some cases. In operation 404, the coinbase value associated with the candidate block is determined. In some cases, the coinbase value may be specified in a coinbaseValue field in the candidate block header. In some other cases, the coinbase value may be determined by analyzing the candidate block to total the transaction fees from transactions in the block and adding the value of the coinbase transaction.

In operation 406, the pool coordinator may obtain current conversion rates from an external source. The conversion rates are conversion ratios between the unit associated with the blockchain network and a common unit. In one example, the common unit is USD, but it may be any arbitrary token, coin, currency, or other unit.

The difficulty setting for the ith blockchain is obtained in operation 408. The difficulty setting may be based on a target value contained in the candidate block header.

In operation 410, the pool coordinator determines the expectation value associated with the candidate block based on the difficulty setting and the coinbase value. For example, the pool coordinator may determine the expectation value as the product of the target value and the coinbase value divided by the total hash space value. In some cases, the product further includes the pool hashpower, which may be a value reflective of the hashpower of the pool or may be an arbitrary hashpower value. In some cases, the product further includes the conversion factor obtained in operation 406.

Having determined the expectation value associated with the new candidate block generated in operation 402, the pool coordinator then compares the expectation value to the expectation values determined for candidate blocks of the other blockchains, if any, in operation 412. The other expectation values may have been determined earlier as each of the other candidate blocks was generated by its respective blockchain code. In some instances, operation 412 includes recalculating the conversion of each expectation value to the common unit so as to use current conversion rates obtained in operation 406. Comparing the expectation values includes determining which of the expectations values is the highest and identifying the corresponding candidate block and blockchain network. In operation 414 the result is output. As noted above, outputting the result may include logging the result, sending an instruction including an identifier for the candidate block or blockchain, forwarding the corresponding candidate block to the mining units, and/or otherwise notifying the mining units of the selected candidate block and blockchain network.

In operation 416, the method 400 may loop back to operation 402 if another expectation value is to be determined. This may be triggered by generation of a new candidate block in some cases. The new candidate block may relate to a different blockchain network than the one just evaluated. In some cases, the trigger is time based and expectation values are determined at regular intervals.

In a variation to the above-described process, each of the mining units may carry out the determination of expectation values independently, and may select from among the provided candidate block headers based on a comparison of expectation values. In such an embodiment, each mining unit may implement the operations of the switch module 320 (FIG. 3), for example using a similar computer-readable software module.

Figure 5:
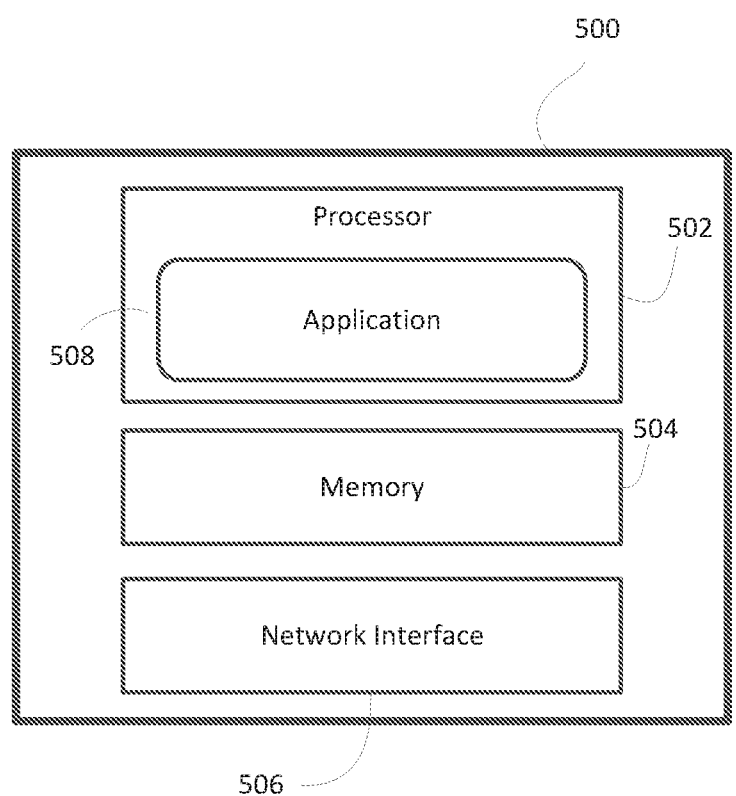
FIG. 5 shows, in block diagram form, a simplified example of a computing node in a blockchain network.

Reference is now made to FIG. 5, which shows, in block diagram form, a simplified computing device 500, in accordance with an example of the present application. The computing device 500 may carry out one or more of the above-described functions. In some examples, the computing device 500 may be a pool coordinator.

The computing device 500 includes a processor 502, which may include one or more microprocessors, application specific integrated circuits (ASICs), microcontrollers, or similar computer processing devices. The computing device 500 may further include memory 504, which may include persistent and non-persistent memory, to store values, variables, and in some instances processor-executable program instructions, and a network interface 506.

The computing device 500 may include a processor-executable application 508 containing processor-executable instructions that, when executed, cause the processor 502 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of controlling a mining pool, the mining pool containing a plurality of mining units and a pool controller, the mining units being configured to mine in accordance with a plurality of blockchain protocols, the method comprising:
for each of a plurality of blockchain networks, generating a respective candidate block containing a plurality of transactions from that blockchain network and having a candidate block header that includes a coinbase value and a difficulty setting for that blockchain network, wherein the coinbase value is determined from a block reward for that blockchain network and transaction fees from transactions included in that candidate block;
for each of the candidate blocks, determining an expectation value based on the difficulty setting and the coinbase value for that candidate block;
based on a comparison of the expectation values, selecting the candidate block associated with the highest of the expectation values; and
providing the candidate block header for the selected candidate block to the mining units for mining.

2. The method claimed in claim 1, wherein determining the expectation value includes determining a probability of finding a next block based on the difficulty setting, and multiplying the probability by the coinbase value to determine the expectation value.

3. The method claimed in claim 2, wherein the difficulty setting includes a target value in an nBits field in the candidate block header, and determining the probability is based on the target value divided by a total hash space value.

4. The method claimed in claim 1, further comprising outputting an identifier of the blockchain network associated with the highest of the expectation values.

5. The method claimed in claim 4, wherein outputting includes publishing to a log.

6. The method claimed in claim 4, wherein outputting includes transmitting to the mining units.

7. The method claimed in claim 6, wherein providing includes providing each of the candidate block headers to the mining units, and wherein the mining units are configured to select the selected candidate block for mining based on the identifier transmitted.

8. The method claimed in claim 1, wherein selecting the candidate block includes converting the expectation values to a common unit for the comparison.

9. The method claimed in claim 8, wherein converting includes requesting and receiving conversion factors from an external database for converting the expectation values to the common unit.

10. The method claimed in claim 8, wherein the common unit is a unit associated with one of the blockchain networks.

11. A system to control a mining pool, the mining pool containing a plurality of mining units and a pool controller, the mining units being configured to mine in accordance with a plurality of blockchain protocols, the system comprising:
one or more processors;
memory; and
computer-executable instructions stored in the memory that, when executed by the one or more processors, cause the processors to:
for each of a plurality of blockchain networks, generate a respective candidate block containing a plurality of transactions from that blockchain network and having a candidate block header that includes a coinbase value and a difficulty setting for that blockchain network, wherein the coinbase value is determined from a block reward for that blockchain network and transaction fees from transactions included in that candidate block;
for each of the candidate blocks, determine an expectation value based on the difficulty setting and the coinbase value for that candidate block;
based on a comparison of the expectation values, select the candidate block associated with the highest of the expectation values; and
provide the candidate block header for the selected candidate block to the mining units for mining.

12. The system claimed in claim 11, wherein the instructions, when executed, are to cause the one or more processors to determine the expectation value by determining a probability of finding a next block based on the difficulty setting, and multiplying the probability by the coinbase value to determine the expectation value.

13. The system claimed in claim 12, wherein the difficulty setting includes a target value in an nBits field in the candidate block header, and wherein the instructions, when executed, are to cause the one or more processors to determine the probability based on the target value divided by a total hash space value.

14. The system claimed in claim 11, wherein the instructions, when executed, are to further cause the one or more processors to output an identifier of the blockchain network associated with the highest of the expectation values.

15. The system claimed in claim 14, wherein outputting includes publishing to a log.

16. The system claimed in claim 14, wherein outputting includes transmitting to the mining units.

17. The system claimed in claim 16, wherein the instructions, when executed, are to cause the one or more processors to provide by the candidate block header providing each of the candidate block headers to the mining units, and wherein the mining units are configured to select the selected candidate block for mining based on the identifier transmitted.

18. The system claimed in claim 11, wherein the instructions, when executed, are to cause the one or more processors to select the candidate block by converting the expectation values to a common unit for the comparison.

19. The system claimed in claim 18, wherein converting includes requesting and receiving conversion factors from an external database for converting the expectation values to the common unit.

20. The system claimed in claim 18, wherein the common unit is a unit associated with one of the blockchain networks.

* * * * *